(12) United States Patent
Yang et al.

(10) Patent No.: US 10,672,274 B2
(45) Date of Patent: Jun. 2, 2020

(54) TRAJECTORY DETECTION

(71) Applicant: Harman International Industries, Incorporated, Stamford, CT (US)

(72) Inventors: Zeng Yang, Shanghai (CN); Qingshan Zhang, Shanghai (CN)

(73) Assignee: Harman International Industries, Incorporated, Stamford, CT (US)

(*) Notice: Subject to any disclaimer, the term of this patent is extended or adjusted under 35 U.S.C. 154(b) by 188 days.

(21) Appl. No.: 15/519,390

(22) PCT Filed: Nov. 11, 2014

(86) PCT No.: PCT/CN2014/090823
§ 371 (c)(1),
(2) Date: Apr. 14, 2017

(87) PCT Pub. No.: WO2016/074155
PCT Pub. Date: May 19, 2016

(65) Prior Publication Data
US 2017/0236421 A1    Aug. 17, 2017

(51) Int. Cl.
*G08G 1/16* (2006.01)
*G01S 13/931* (2020.01)
(Continued)

(52) U.S. Cl.
CPC ............ *G08G 1/163* (2013.01); *B60W 30/08* (2013.01); *B60W 30/095* (2013.01); *B60W 30/0956* (2013.01); *G01S 7/003* (2013.01); *G01S 13/726* (2013.01); *G01S 13/931* (2013.01); *G01S 15/66* (2013.01); *G01S 15/931* (2013.01); *G01S 17/66* (2013.01); *G01S 17/936* (2013.01);
(Continued)

(58) Field of Classification Search
CPC ..................................................... G08G 1/163
See application file for complete search history.

(56) References Cited

U.S. PATENT DOCUMENTS

| 6,944,543 | B2 | 9/2005 | Prakah-Asante et al. |
| 7,002,464 | B2 * | 2/2006 | Bruemmer ............... H04Q 9/00 340/309.16 |

(Continued)

FOREIGN PATENT DOCUMENTS

| CN | 1916991 A | 2/2007 |
| CN | 103350698 A | 10/2013 |

OTHER PUBLICATIONS

ISA State Intellectual Property Office of the People's Republic of China, International Search Report and Written Opinion Issued in Application No. PCT/CN2014/090823, dated Jul. 1, 2015, WIPO, 12 pages.

(Continued)

*Primary Examiner* — Donald J Wallace
(74) *Attorney, Agent, or Firm* — McCoy Russell LLP (57) ABSTRACT

A trajectory detection method and a trajectory detection system are provided. The method includes: receiving, on a first vehicle, from a second vehicle, dynamic data containing at least one dynamic feature of the second vehicle; detecting a relative position of the second vehicle with regard to the first vehicle using an object detection sensor mounted on the first vehicle; and generating a trajectory of the second vehicle based on the relative position and the dynamic data. Accuracy may be improved.

20 Claims, 5 Drawing Sheets

(51) Int. Cl.
*G01S 7/00* (2006.01)
*G01S 13/72* (2006.01)
*B60W 30/095* (2012.01)
*B60W 30/08* (2012.01)
*G01S 15/66* (2006.01)
*G01S 15/931* (2020.01)
*G01S 17/66* (2006.01)
*G01S 17/93* (2020.01)
*G08G 1/04* (2006.01)
*G08G 1/056* (2006.01)
*G01S 13/93* (2020.01)

(52) U.S. Cl.
CPC ............... *G08G 1/04* (2013.01); *G08G 1/056* (2013.01); *B60W 2420/52* (2013.01); *B60W 2420/54* (2013.01); *B60W 2520/10* (2013.01); *B60W 2550/10* (2013.01); *B60W 2550/306* (2013.01); *B60W 2550/308* (2013.01); *B60W 2550/408* (2013.01); *G01S 2013/936* (2013.01); *G01S 2013/9364* (2013.01); *G01S 2013/9367* (2013.01)

(56) References Cited

U.S. PATENT DOCUMENTS

| | | |
|---|---|---|
| 2001/0018641 A1 | 8/2001 | Kodaka et al. |
| 2002/0027918 A1* | 3/2002 | Burmeister ............. H04L 29/06 370/394 |
| 2004/0116134 A1* | 6/2004 | Maeda ................. H04B 7/1855 455/457 |
| 2007/0043502 A1 | 2/2007 | Mudalige et al. |
| 2007/0177520 A1* | 8/2007 | Morinaga ........... H04L 43/0876 370/252 |
| 2010/0198513 A1 | 8/2010 | Zeng et al. |
| 2011/0080302 A1* | 4/2011 | Muthaiah ................ H04L 47/10 340/903 |
| 2011/0238986 A1* | 9/2011 | Kherani ................ H04L 1/0041 713/168 |
| 2013/0226407 A1 | 8/2013 | Rentschler et al. |
| 2013/0261948 A1 | 10/2013 | Funabashi |

OTHER PUBLICATIONS

European Patent Office, Extended European Search Report Issued in Application No. 14905722.6, dated Jun. 12, 2018, Germany, 12 pages.

* cited by examiner

TRAJECTORY DETECTION

CROSS REFERENCE TO RELATED APPLICATIONS

The present application is a U.S. National Phase of International Patent Application Serial No. PCT/CN2014/090823, entitled "TRAJECTORY DETECTION," and filed on Nov. 11, 2014, the entire contents of which are hereby incorporated by reference for all purposes.

TECHNICAL FIELD

The present disclosure generally relates to trajectory detection.

BACKGROUND

Trajectory, also called path history, refers to a recent route that a vehicle has traversed. Trajectory detection can facilitate many vehicular applications. Therefore, nowadays some vehicle-mounted systems can implement trajectory detection. In some existing solutions, trajectory detection is based on global positioning system (GPS) data. However, due to poor precision of GPS data, trajectories calculated based on GPS data may not be accurate enough.

SUMMARY

In one embodiment, a trajectory detection method is provided. The method may include: receiving, on a first vehicle, from a second vehicle, dynamic data containing at least one dynamic feature of the second vehicle; detecting a relative position of the second vehicle with regard to the first vehicle using an object detection sensor mounted on the first vehicle; and generating a trajectory of the second vehicle based on the relative position and the dynamic data.

In some embodiments, the dynamic data may include velocity data and heading data of the second vehicle. In some embodiments, the dynamic data may be generated by on-board sensors of the second vehicle. In some embodiments, the dynamic data received from the second vehicle may be contained in basic safety message (BSM) packets.

In some embodiments, the relative position of the second vehicle with regard to the first vehicle may be detected by a radar, a sonar, a lidar, or any combination thereof. In some embodiments, the relative position of the second vehicle with regard to the first vehicle may include distance information and direction information.

In some embodiments, the first vehicle may detect the relative position of the second vehicle with regard to the first vehicle at a first time point, and calculate the trajectory of the second vehicle based on a first set of dynamic data containing the at least one dynamic feature of the second vehicle, where the first set of dynamic data are generated before the first time point, where the calculated trajectory ends at a point calculated based on a position where the first vehicle locates at the first time point and the relative position.

In some embodiments, the first vehicle may detect the relative position of the second vehicle with regard to the first vehicle at a second time point, and calculate the trajectory based on a second set of dynamic data containing the at least one dynamic feature of the second vehicle, where the second set of dynamic data are generated after the second time point, where the calculated trajectory starts from a point calculated based on a position there the first vehicle locates at the second time point and the relative position. In some embodiments, the first vehicle may modify the calculated trajectory based on an updated relative position of the second vehicle with regard to the first vehicle.

In some embodiments, the trajectory of the second vehicle may be calculated using a dead reckoning method. Dead reckoning is a method typically used in navigation, which can calculate a current position of an object by using its previously determined position in conjunction with its speed and heading information during the elapsed time. Specifically, in a dead reckoning process, a trajectory is calculated based on the speed and heading information, then the current position is obtained based on the previously determined position and the calculated trajectory.

In some embodiments, the method may further include: receiving a plurality sets of dynamic data from a plurality of vehicles; detecting at least two relative positions of the second vehicle with regard to the first vehicle at different time points; calculating a first position variation of each of the plurality of vehicles based on the dynamic data received from the corresponding vehicle; calculating a second position variation of the second vehicle based on the at least two relative positions; and determining whether there is a vehicle in the plurality of vehicles which represents the second vehicle by comparing the first position variation of each of the plurality of vehicles with the second position variation of the second vehicle.

In some embodiments, the dynamic data are generated at different time points and transmitted in packets, the method may further include: obtaining a first set of time points respectively representing when the packets are sent from the second vehicle; subtracting each one of the first set of time points by a predetermined value to obtain a second set of time points; detecting the relative position of the second vehicle with regard to the first vehicle at one of the second set of time points; and calculating the trajectory of the second vehicle based on the relative position, the dynamic data and the second set of time points. The predetermined value may represent the time elapsing from generating dynamic data to sending a packet containing the dynamic data, thus the second set of time points may represent when the dynamic data are generated. For example, when the packets are BSM packets, the predetermined time interval may be set as 50 ms.

In some embodiments, the method may further include: if there is a pair of neighboring time points in the second set of time points, which have an interval greater than a first predetermined threshold, performing an interpolation calculation for the dynamic data corresponding to the pair of neighboring time points. For example, when the packets are BSM packets which should be transmitted in every 100 ms, the first predetermined threshold may be set as 200 ms. If the time interval between two packets is greater than 200 ms, it may have a great chance that a packet drop occurred. Therefore, interpolation may be performed to estimate dynamic data contained in the assumed dropped packet.

In some embodiments, the method may further include: if there is a pair of neighboring time points in the second set of time points, which have an interval greater than a second predetermined threshold, modifying the latter time point in the pair to be closer to the former time point in the pair. For example, when the packets are BSM packets which should be transmitted in every 100 ms, the second predetermined threshold may be set as 150 ms. If the time interval between two packets is greater than 150 ms, it can be assumed that congestion occurred. Therefore, the latter time point in the pair may be modified to be closer to the former one, so as to offset the influence raised by the congestion.

In one embodiment, a trajectory detection method is provided. The method may include: generating a trajectory of a first vehicle based on dynamic data containing at least one dynamic feature of the first vehicle and position relationship between the first vehicle and a second vehicle, where the dynamic data are generated by a device mounted on the first vehicle, and the position relationship is generated by an object detection device mounted on the second vehicle.

In some embodiments, the dynamic data may include velocity data and heading data of the second vehicle.

In some embodiments, the position relationship between the first vehicle and the second vehicle may include distance information and direction information.

In some embodiments, the position relationship between the first vehicle and the second vehicle is detected at a first time point, and the trajectory of the first vehicle may be calculated based on a first set of dynamic data containing the at least one dynamic feature of the first vehicle, where the first set of dynamic data are generated before the first time point, where the calculated trajectory ends at a point calculated based on a position where the second vehicle locates at the first time point and the position relationship between the first vehicle and the second vehicle.

In some embodiments, the position relationship between the first vehicle and the second vehicle is detected at a second time point, and the trajectory of the first vehicle may be calculated based on a second set of dynamic data containing the at least one dynamic feature of the first vehicle, where the second set of dynamic data are generated after the second time point, where the calculated trajectory starts from a point calculated based on a position where the second vehicle locates at the second time point and the position relationship between the first vehicle and the second vehicle. In some embodiments, the calculated trajectory may be modified based on an updated position relationship between the first vehicle and the second vehicle.

In some embodiments, the trajectory of the first vehicle may be calculated using a dead reckoning method.

In some embodiments, the method may further include: receiving a plurality set of dynamic data from a plurality of vehicles; calculating a first position variation of each of the plurality of vehicles based on the dynamic data received from the corresponding vehicle; calculating a second position variation of the first vehicle based on the at least two relative positions detected at different time points; and determining whether there is a vehicle in the plurality of vehicles which represents the second vehicle by comparing the first position variation of each of the plurality of vehicles with the second position variation of the second vehicle.

In some embodiments, the dynamic data are generated at different time points and transmitted in packets, the method may further include: obtaining a first set of time points respectively representing when the packets are sent from the first vehicle; subtracting each one of the first set of time points by a predetermined value to obtain a second set of time points, wherein the second set of time points represent when the dynamic data are generated; detecting the position relationship between the first vehicle and the second vehicle at one of the second set of time points; and calculating the trajectory of the first vehicle based on the position relationship between the first vehicle and the second vehicle, the dynamic data and the second set of time points.

In some embodiments, the method may further include: if there is a pair of neighboring time points in the second set of time points, which have an interval greater than a first predetermined threshold, performing an interpolation calculation for the dynamic data corresponding to the pair of neighboring time points.

In some embodiments, the method may further include: if there is a pair of neighboring time points in the second set of time points, which have an interval greater than a second predetermined threshold, modifying the latter time point in the pair to be closer to the former time point in the pair.

In one embodiment, a trajectory detection system mounted on a first vehicle is provided. The system may include: an object detection sensor for detecting a relative position of a second vehicle with regard to the first vehicle; a communication device for receiving, from the second vehicle, dynamic date containing at least one dynamic feature of the second vehicle; and a processing device for calculating a trajectory of the second vehicle based on the relative position and the dynamic data.

In some embodiments, the system may further include a memory device for storing the dynamic data.

In some embodiments, the relative position of the second vehicle with regard to the first vehicle may include distance information and direction information. In some embodiments, the object detection sensor may include a radar, a sonar, a lidar, or a combination thereof.

In some embodiments, the communication device may receive packets containing velocity data and heading data of the second vehicle.

In some embodiments, the processing device may be configured to: obtain the relative position which is detected at a first time point; obtain a first set of dynamic data which contain the at least one dynamic feature of the second vehicle, where the first set of dynamic data are generated before the first time point; and calculate the trajectory of the second vehicle based on the first set of dynamic data, where the trajectory ends at a point calculated based on a position where the first vehicle locates at the first time point and the relative position.

In some embodiments, the processing device may be configured to: obtain the relative position which is detected at a second time point; obtain a second set of dynamic data which contain the at least one dynamic feature of the second vehicle, where the second set of dynamic data are generated after the second time point; and calculate the trajectory of the second vehicle based on the second set of dynamic data, where the trajectory starts from a point calculated based on a position where the first vehicle locates at the second time point and the relative position. In some embodiments, the processing device may be further configured to: obtain an updated relative position of the second vehicle with regard to the first vehicle detected at a third time point; and modify the trajectory based on the updated relative position.

In some embodiments, the processing device may be configured to calculate the trajectory using a dead reckoning method.

In some embodiments, the communication device may be adapted for receiving a plurality sets of dynamic data from a plurality of vehicles, and the processing device may be further configured to: calculate a first position variation of each of the plurality of vehicles based on the dynamic data received from the corresponding vehicle; calculate a second position variation of the second vehicle based on the at least two relative positions; and determine whether there is a vehicle in the plurality of vehicles which represents the second vehicle by comparing the first position variation of each of the plurality of vehicles with the second position variation of the second vehicle.

In some embodiments, the communication device may be adapted for receiving the dynamic data packet by packet, the object detection sensor may be adapted for detecting relative positions of the second vehicle with regard to the first vehicle at different time points, and the processing device may be further configured to: obtain a first set of time points respectively representing when the packets are sent at the second vehicle; subtract each one of the first set of time points by a predetermined value to obtain a second set of time points; select one of the second set of time points and obtain the relative position of the second vehicle with regard to the first vehicle detected at the selected time point; and calculate the trajectory of the second vehicle based on the selected relative position, the dynamic data and the second set of time points.

In some embodiments, the processing device may be further configured to: determine whether there is a pair of neighboring time points in the second set of time points, which have an interval greater than a first predetermined threshold; and perform an interpolation calculation for the dynamic data corresponding to the pair of neighboring time points in response to determining that the interval between the pair of neighboring time points is greater than the first predetermined threshold.

In some embodiments, the processing device may be further configured to: determine whether there is a pair of neighboring time points in the second set of time points, which have an interval greater than a second predetermined threshold; and modify the latter time point in the pair to be closer to the former time point in the pair in response to determining that the interval between the pair of neighboring time points is greater than the second predetermined threshold.

In one embodiment, a trajectory detection system is provided. The system may include a processing device configured to generate a trajectory of a first vehicle based on dynamic data containing at least one dynamic feature of the first vehicle and position relationship between the first vehicle and a second vehicle, where the dynamic data are generated by a device mounted on the first vehicle, and the position relationship is generated by an object detection device mounted on the second vehicle.

In some embodiments, the dynamic data may include velocity data and heading data of the second vehicle.

In some embodiments, the position relationship between the first vehicle and the second vehicle may include distance information and direction information.

In some embodiments, the position relationship between the first vehicle and the second vehicle is detected at a first time point, and the processing device may be configured to calculate the trajectory of the first vehicle based on a first set of dynamic data containing the at least one dynamic feature of the first vehicle, where the first set of dynamic data are generated before the first time point, where the calculated trajectory ends at a point calculated based on a position where the second vehicle locates at the first time point and the position relationship between the first vehicle and the second vehicle.

In some embodiments, the position relationship between the first vehicle and the second vehicle is detected at a second time point, and the processing device may be configured to calculate the trajectory of the first vehicle based on a second set of dynamic data containing the at least one dynamic feature of the first vehicle, where the second set of dynamic data are generated after the second time point, where the calculated trajectory starts from a point calculated based on a position where the second vehicle locates at the second time point and the position relationship between the first vehicle and the second vehicle. In some embodiments, the processing device may be further configured to modify the calculated trajectory based on an updated position relationship between the first vehicle and the second vehicle.

In some embodiments, the processing device may be configured to calculate the trajectory of the first vehicle using a dead reckoning method.

In some embodiments, the processing device may be further configured to: receive a plurality set of dynamic data from a plurality of vehicles; calculate a first position variation of each of the plurality of vehicles based on the dynamic data received from the corresponding vehicle; calculate a second position variation of the first vehicle based on the at least two relative positions detected at different time points; and determine whether there is a vehicle in the plurality of vehicles which represents the second vehicle by comparing the first position variation of each of the plurality of vehicles with the second position variation of the second vehicle.

In some embodiments, the dynamic data are generated at different time points and transmitted in packets, the processing device may be further configured to: obtain a first set of time points respectively representing when the packets are sent from the first vehicle; subtract each one of the first set of time points by a predetermined value to obtain a second set of time points, wherein the second set of time points represent when the dynamic data are generated; detect the position relationship between the first vehicle and the second vehicle at one of the second set of time points; and calculate the trajectory of the first vehicle based on the position relationship between the first vehicle and the second vehicle, the dynamic data and the second set of time points.

In some embodiments, the processing device may be further configured to: if there is a pair of neighboring time points in the second set of time points, which have an interval greater than a first predetermined threshold, perform an interpolation calculation for the dynamic data corresponding to the pair of neighboring time points.

In some embodiments, the processing device may be further configured to: if there is a pair of neighboring time points in the second set of time points, which have an interval greater than a second predetermined threshold, modify the latter time point in the pair to be closer to the former time point in the pair.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Currently, some vehicles are equipped with object detection sensors which can detect relative positions of vehicles nearby. These relative positions can be utilized to improve the accuracy of trajectory detection, as normally object detection sensors have better precision than GPS devices.

Figure 1:
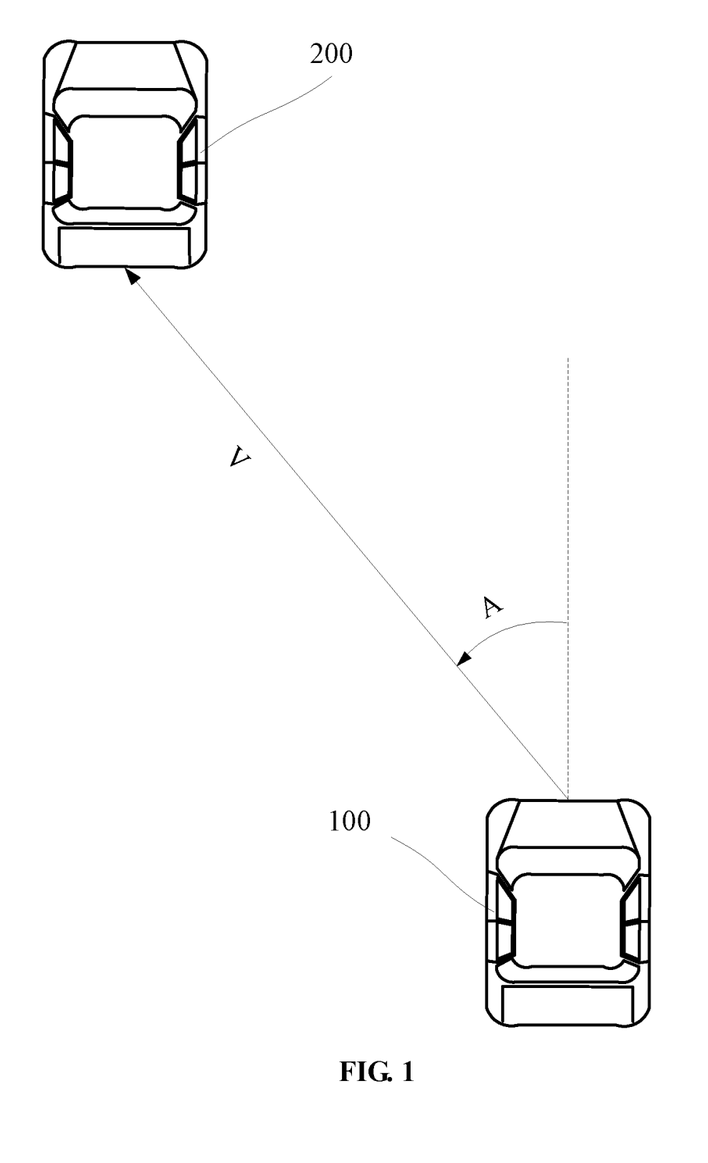
FIG. 1 schematically illustrates relative position detection.

FIG. 1 schematically illustrates relative position detection. As shown in FIG. 1, a vehicle 100 (the host vehicle) may use its object detection sensor to detect a relative position of a vehicle 200 (the target vehicle) with regard to itself. The relative position of the vehicle 200 may include a relative distance between the vehicle 100 and the vehicle 200, plus direction information. In FIG. 1, the direction information is illustrated using a straight line arrow. In some embodiments, the direction information may be contain an arc from the heading of vehicle 100, which is illustrated using a dotted line in FIG. 1, to an arrow V from the vehicle 100 to the vehicle 200. For example, as shown in FIG. 1, the arc, which is anti-clockwise, is labelled as A.

There are various sensors which can detect relative position of an object with ideal accuracy. In some embodiments, the vehicle 100 may use a radar, a lidar, a sonar or even a camera to detect the vehicle 200, and obtain data of the relative position.

Based on the relative position of the vehicle 200, the trajectory of the vehicle 200 can be calculated in conjunction with dynamic feature thereof. In some embodiments, the vehicle 100 may receive dynamic data from the vehicle 200, which contain at least one dynamic feature of the vehicle 200. The at least one dynamic feature of the vehicle 200 may include heading, velocity, or a combination thereof. There are various methods for calculating a traversing path of an object based on its dynamic feature, for example, inertial navigation methods, dead reckoning methods and the like. In such way, the vehicle 100 can calculate the trajectory of the vehicle 200 based on the relative position and the received dynamic data. Since the dynamic data may be generated by one or more on-board sensors of the vehicle 200, real-time information contained therein can describe the real-time movement of the vehicle 200 more precisely. Therefore, the trajectory calculated based on the relative position and the dynamic data may be more accurate.

Hereunder gives specific embodiments for implementing the above described trajectory detection method. Detail processing steps and structural schemes will be illustrated. Note that the details are merely for illustrating, but not intended to limit the scope of the present disclosure.

Figure 2:
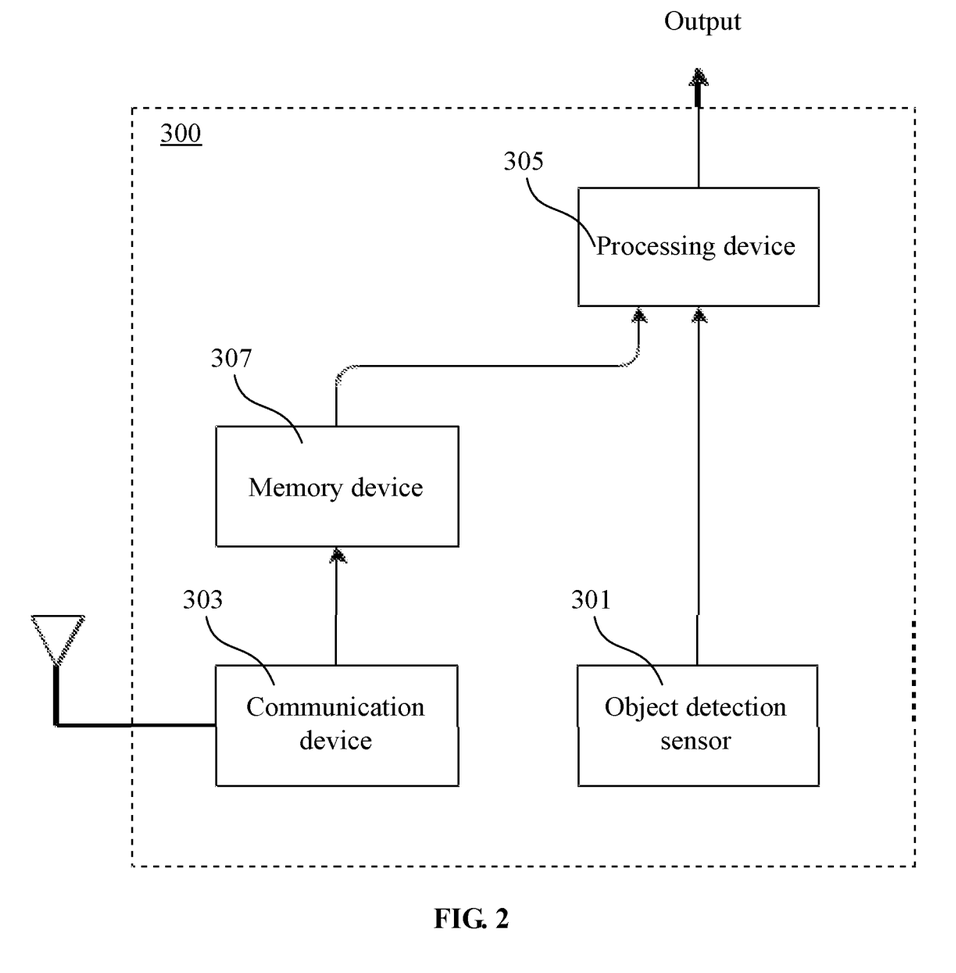
FIG. 2 schematically illustrates a block diagram of a trajectory detection system 300 according to embodiments.

FIG. 2 schematically illustrates a block diagram of a trajectory detection system 300 according to embodiments. The trajectory detection system 300 may be mounted on a vehicle, such as the vehicle 100, for detecting trajectory of other vehicles, such as the vehicle 200.

In some embodiments, the trajectory system 300 may include an object detection sensor 301, a communication device 303 and a processing device 305. The object detection sensor 301 may be used for detecting relative positions of other vehicles. The communication device 303 may be used for receiving dynamic data from other vehicles. And the processing device 305 may be used for calculating trajectories based on the relative positions and the dynamic data. In some embodiments, the trajectory system 300 may further include a memory device 307 for storing the received dynamic data therein, such that the processing device 305 can invoke dynamic data of a specific vehicle from the memory device 307 when trajectory calculation is initiated. The calculated trajectory may be output for other usages, such as safety application.

It should be noted that components of the trajectory detection system 300 are not necessarily mounted together on one vehicle. For example, the processing device 305 may be disposed in a remote server which can communicate with a vehicle having other components of the trajectory detection system 300, such that the processing device 305 can obtain dynamic data and relative position information to implement its processing.

Figure 3:
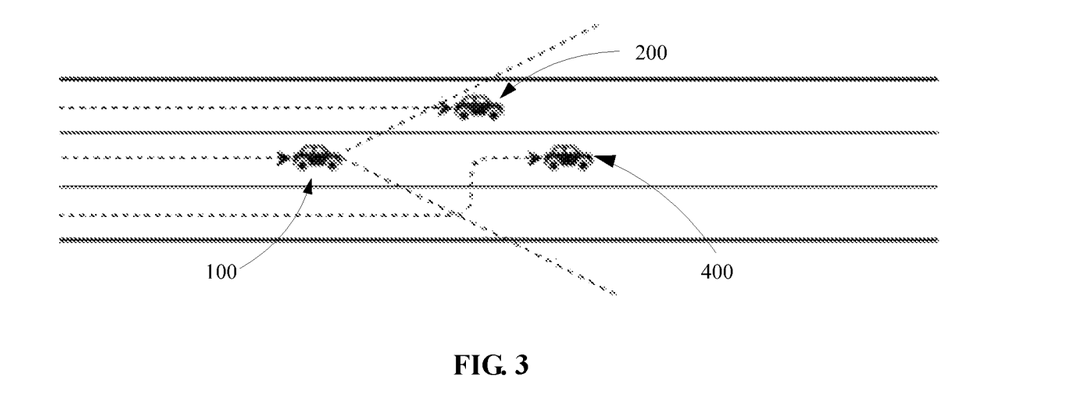
FIG. 3 schematically illustrates a practical trajectory detection scenario.

In practical scenarios, there may be more than one vehicle surrounding the host vehicle. For example, FIG. 3 schematically illustrates a practical trajectory detection scenario in which there is a vehicle 400, other than the vehicle 200 as mentioned above, near the host vehicle 100. Dotted lines with arrows ends at the vehicles 100, 200 and 400 represent trajectories thereof, respectively. Dotted lines starting from the vehicle 100 schematically illustrate a detection range of the object detection sensor 301 mounted on the vehicle 100. In such occasion, the trajectory detection system 300 needs to detect the trajectories of the vehicle 200 and the vehicle 400, respectively. Descriptions below will illustrate how the trajectory detection system 300 can distinguish the two vehicles 200 and 400, and calculate their trajectories, respectively.

Figure 4:
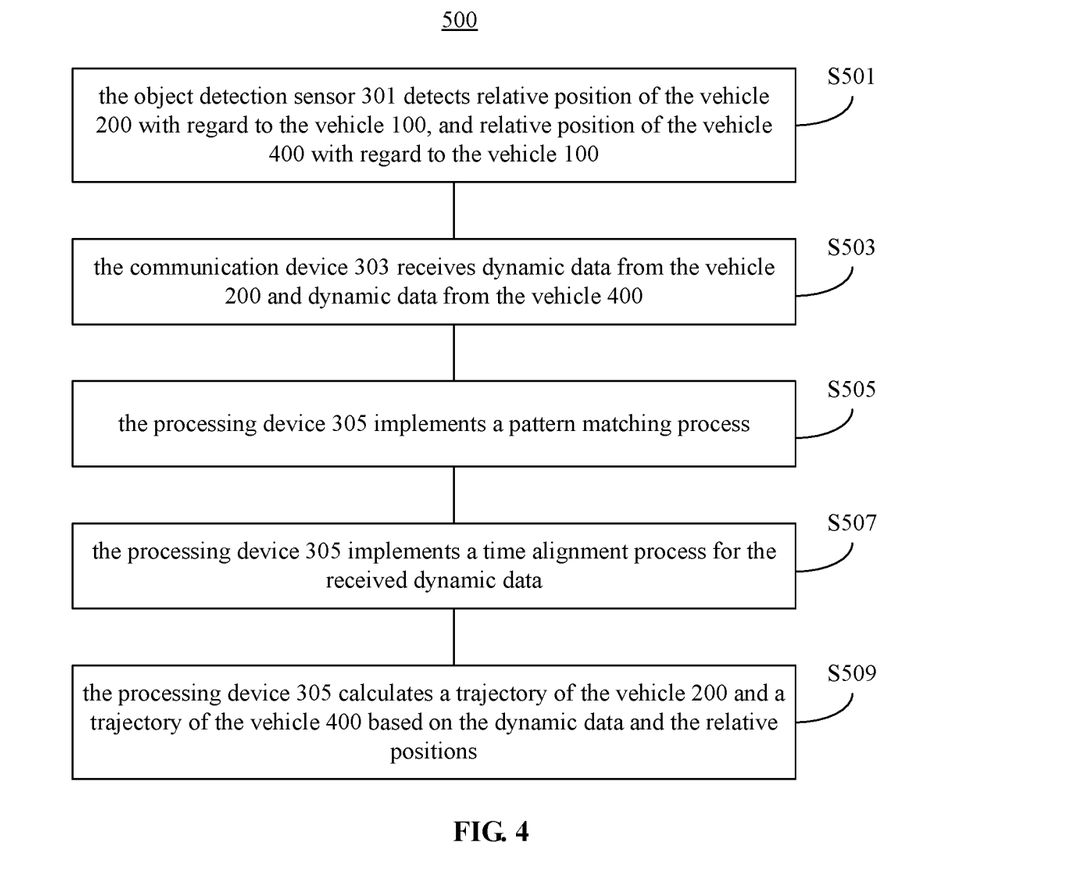
FIG. 4 schematically illustrates a flow chart of a process for detecting trajectories for more than one vehicle according to embodiments.

FIG. 4 schematically illustrates a flow chart of a process 500 for detecting trajectories for more than one vehicle according to embodiments.

In S501, the object detection sensor 301 detects relative position of the vehicle 200 with regard to the vehicle 100, and relative position of the vehicle 400 with regard to the vehicle 100.

In some embodiments, the object detection sensor 301, such as a radar, can actually track the vehicle 200 and the vehicle 400, so the relative positions of the two vehicles 200 and 400 are updated continuously in real-time. It could be understood that the object detection sensor 301 is capable of distinguishing different objects.

In S503, the communication device 303 receives dynamic data from the vehicle 200 and dynamic data from the vehicle 400.

The dynamic data received from the vehicles 200 and 400 respectively contain dynamic features of the vehicles 200 and 400. As described above, the dynamic data may contain information of headings and velocities, and may be generated by on-board sensors which can detect headings and velocities accurately. In some embodiments, the dynamic data may be transmitted packet by packet. For example, at a specific time point, the on-board sensors mounted on the vehicle 200 generate dynamic data of the vehicle 200. Thereafter, the vehicle 200 sends a packet containing the dynamic data to the vehicle 100. The steps of generating dynamic data and sending packet containing the dynamic data may be repeated at the vehicle 200, such that real-time dynamic data reflecting how the vehicle 200 is moving can be received by the vehicle 100 packet by packet. Similar processing may also be implemented at the vehicle 400. In some embodiments, the dynamic data may be carried in basic safety message (BSM) packets for those vehicles which can implement BSM communication. As BSM packets originally contain dynamic data like heading and velocity, less change to existing vehicle mounted components may be required. It should be noted that other communication schemes can also be used.

The dynamic data received from the vehicle 200 and the dynamic data received from the vehicle 400 may be respectively stored in the memory device 307. In such way, the vehicle 100 can keep recording a movement history for each of the vehicles nearby.

It should be noted that, S501 and S503 are not necessarily performed in a specific sequence. In some embodiments, the trajectory detection system 300 may keep receiving and recording the dynamic data, and keeping detecting and recording the relative positions at the meantime. When trajectory calculation is required, the stored dynamic data and relative position may be used for calculating the trajectory.

In S505, the processing device 305 implements a pattern matching process.

Although the object detection sensor 301 can distinguish the vehicles 200 and 400, and the dynamic data won't be mixed up as the communication device 303 can recognize different transmitters, there is still a need to match the relative positions with the dynamic data. Specifically, in the practical scenario illustrated in FIG. 3, there are two sets of relative positions respectively correspond to the two vehicles 200 and 400, and two sets of dynamic data respectively belong to the two vehicles 200 and 400. The trajectory detection system 300 needs to match the relative positions with the dynamic data which belong to the same vehicle.

In some embodiments, a movement pattern may be calculated based on each set of the relative positions, and each set of the dynamic data. Then the movement patterns may be compared and analyzed to determine which set of relative positions corresponds to which set of dynamic data.

Figure 5:
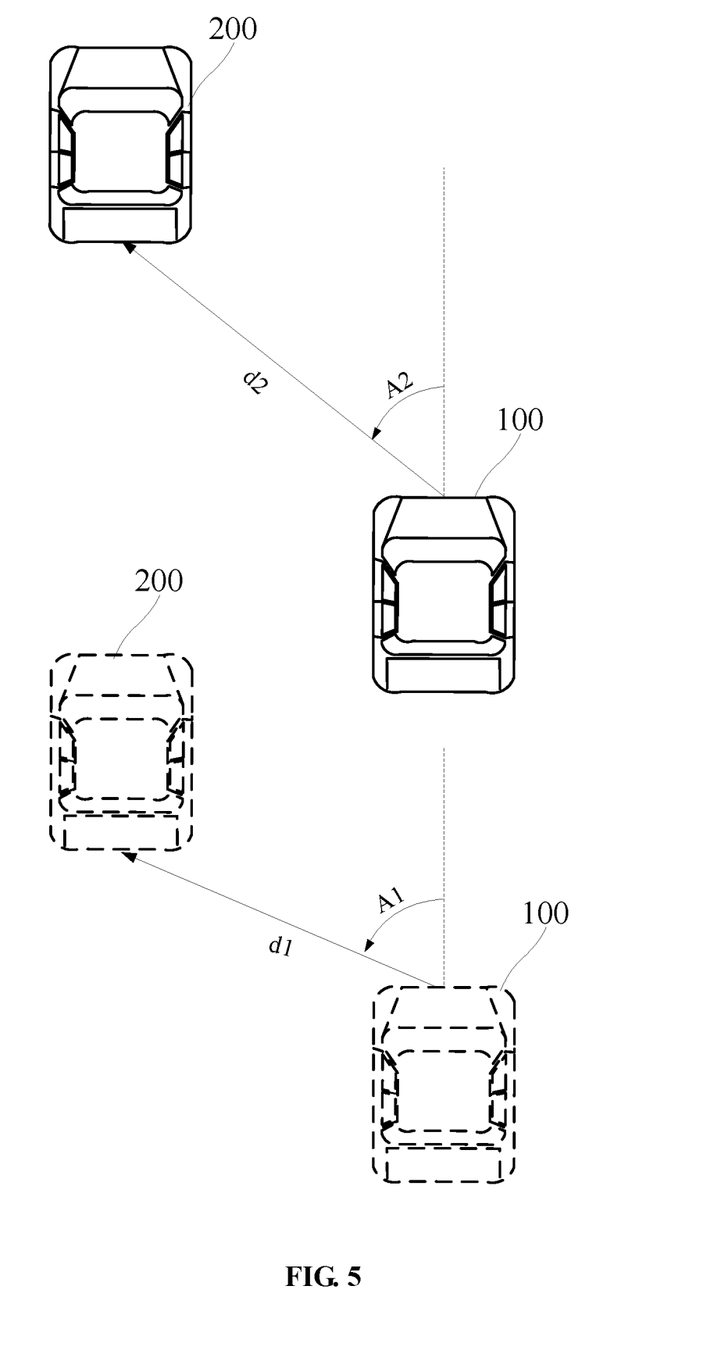
FIG. 5 schematically illustrates calculating first position variation according to embodiments.

Specifically, for example, the processing device 305 may calculate a first position variation based on two relative positions in the set of relative positions of the vehicle 200. The position variation may represent a relative position change of the vehicle 200 between two time points at which the two relative positions are detected. FIG. 5 schematically illustrates calculating the first position variation according to embodiments. Positions of the vehicles 100 and 200 at a first time point are illustrated using broken line icons, and their positions at a second time point are illustrated using solid line icons, respectively. At the first time point, the relative position of the vehicle 200 with regard to the vehicle 100 can be denoted as a first vector. Details of the first vector may include a first relative distance d1 and a first relative angle A1, which can be detected by the object detection sensor 301. At the second time point, the relative position of the vehicle 200 with regard to the vehicle 100 can be denoted as a second vector with a second relative distance d2 and a second relative angle A2, which is also detectable. As long as the position variation of the vehicle 100 between the first time point and the second time point can be easily calculated based on heading and velocity data obtained from on-board sensors of itself, the position variation of the vehicle 200 between the first and second time points also can be calculated.

Further, the processing device 305 may select two packets received from a vehicle. Dynamic data contained in the selected two packets may be generated at the first and second time points, or time points close to the first and second time points. As such, a second position variation reflecting how the vehicle moves between the first and second time points can be calculated based on the dynamic data contained in the selected two packets. Since there are other vehicles sending dynamic data to the vehicle 100, the processing device 305 may calculate a plurality of second position variations for these vehicles. Thereafter, the processing device 305 may compare the first position variation with each of the second position variations to determine whether there is a match, i.e., whether there is a set of dynamic data which is received from the vehicle 200. Similar processing may be implemented for matching the relative positions with the dynamic data which both belong to the vehicle 400. As such, the trajectories of the vehicles 200 and 400 can be calculated based on their respective dynamic data and relative position.

In some embodiments, the time slot between the first and the second time points may be set as a time slot for receiving two packets, for example, 100 ms when using BSM packets. In some embodiments, the position variation is calculated for more than one time slots. It could be understood that as time elapses, movement patterns of the vehicle 200 and the vehicle 400 will be more and more distinct. Therefore, calculating position variation for more time slots may further help matching the relative positions and the dynamic data.

Calculating and comparing the position variations can be realized by various algorithms well known in the art. Therefore, it won't be described in detail here.

In S507, the processing device 305 implements a time alignment process for the received dynamic data.

Relative positions are detected at specific time points. It could be understood that if the time points at which the dynamic data are generated can be known, the accuracy may be further improved. However, although the packets containing the dynamic data normally have time stamps, the time stamps only reflect when the packets are sent at a transmitter side. Considering the time gap between the dynamic data collecting and the packet transmitting, and possibility of congestion and packet drop, time alignment may be required. Hereunder gives details for implementing the time alignment process for the dynamic data received from the vehicle 200. Similar processing may be implemented for the dynamic data received from the vehicle 400.

Figure 6:
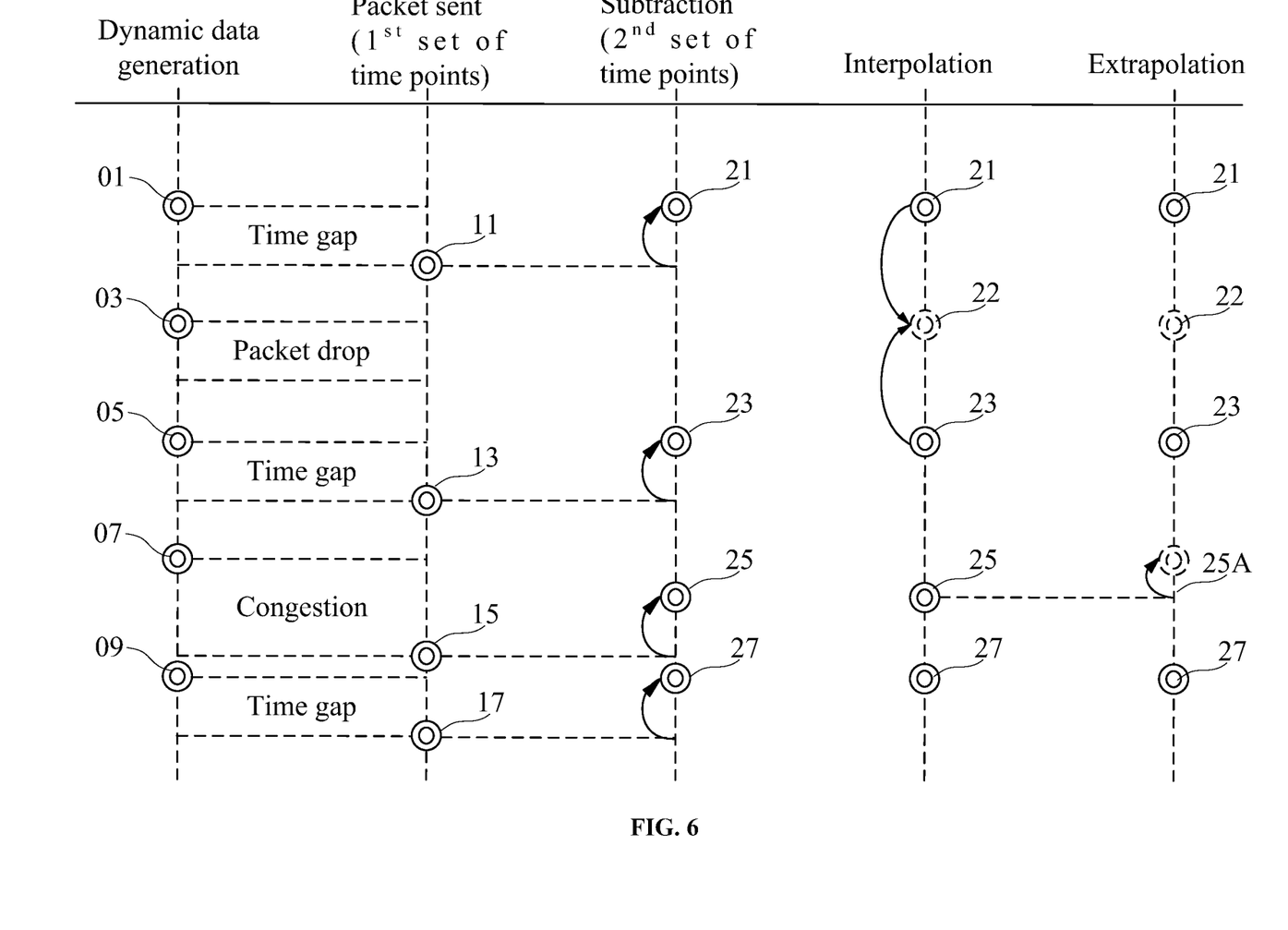
FIG. 6 schematically illustrates a time alignment process according to embodiments.

FIG. 6 schematically illustrates a time alignment process according to embodiments. Specifically, the time alignment may be implemented as follows. A first set of time points 11, 13, 15 and 17 may be obtained by analyzing the packets received from the vehicle 200, for example, simply by analyzing their time stamps. As stated above, there is a gap between when the dynamic data are collected and when the packets containing the dynamic data are sent. Since the first set of time points 11, 13, 15 and 17 obtained based on the time stamps may represent when the packets are sent, in some embodiments, the processing device 305 may subtract each of the first set of time points 11, 13, 15 and 17 with a first predetermined value to obtain a second set of time points 21, 23, 25 and 27. The first predetermined value may be set based on the time gap between the dynamic data collecting and the packet transmitting. For example, normally the gap between collecting the dynamic data and sending the BSM packet, which is transmitted in every 100 ms, containing the dynamic data may be 50 ms. Accordingly, the first predetermined value may be set as 50 ms. With such processing, the second set of time points 21, 23, 25 and 27 may be closer to the actual time points when the dynamic data are collected.

In some embodiments, the processing device 305 may further modify the second set of time points 21, 23, 25 and 27 to eliminate or at least alleviate the influence of packet drop and/or congestion. For example, the processing device 305 may calculate an interval between each pair of neighboring time points in the second set of time points 21, 23, 25 and 27. If there is an interval which is greater than a first predetermined threshold, it may be determined that a packet drop exists between the two time points. For example, as BSM packets are transmitted in every 100 ms, if the time interval between two consecutive packets received at the vehicle 100 is greater than 200 ms, it could be conceived that a packet drop occurred. In such case, the processing device 305 may implement an interpolation calculation. For example, referring to FIG. 6, the interval between the time points 21 and 23 is greater than the first predetermined threshold, it could be assumed that there is a packet drop occurred between the time points 21 and 23. In some embodiments, dynamic data contained in the assumed dropped packet may be estimated based on the dynamic data contained in the two packets corresponding to the two time points 21 and 23, and the estimated dynamic data may be deemed as being collected at a time point 22 between the two time points 21 and 23.

In some embodiments, the processing device 305 may further check whether this is an interval which is greater than a second predetermined threshold. For example, the second predetermined threshold may be set as 150 ms. Since BSM packets should be transmitted in every 100 ms, if the interval between two consecutive packets is greater than 150 ms, it can be speculated that the latter packet may be delayed, i.e., congestion occurred. Therefore, an extrapolation process may be performed. As such, the latter one of the two time points may be adjusted to be closer to the former one, so as to alleviate the influence of congestion. For example, referring to FIG. 6, the interval between the time points 23 and 25 is greater than the second predetermined threshold. Therefore, the latter time point 25 is adjusted to be a new time point 25A which is closer to the former time point 23.

After the above processing, the dynamic data, together with the result of interpolation, may be corresponded to the updated second set of time points 21, 22, 23, 25A, and 27, which may be closer to the time points 01, 03, 05, 07 and 09 compared with the first set of time points 11, 13, 15 and 17. That is to say, after the above processing, the time information corresponding to the dynamic data may better reflect when these dynamic data are actually collected. It should be noted that the above mentioned detail values of the first and the second predetermined thresholds are merely examples. Those skilled in the art can make adjustment based on practical requirements.

It should be noted that, the sequence of S505 and S507 may be changeable. In some embodiments, the time alignment may be performed prior to the pattern matching, such that the pattern matching may be more effective.

In S509, the processing device 305 calculates a trajectory of the vehicle 200 and a trajectory of the vehicle 400 based on the dynamic data and the relative positions.

As the dynamic data received from the vehicle 200 are matched with the relative position of the vehicle 200, and their time information are aligned, the trajectory of the vehicle 200 can be calculated, so does the trajectory of the vehicle 400.

Take calculating the trajectory of the vehicle 200 as an example. The processing device 305 may obtain from the object detection sensor 301 a specific relative position of the vehicle 200 with regard to the vehicle 100 from the set of relative positions. The specific relative position of the vehicle 200 may be detected at a specific time point, for example, the present time point. The processing device 305 may further obtain a specific set of dynamic data of the vehicle 200 received by the communication device 303. In some embodiments, the specific set of dynamic data of the vehicle 200 may contain the dynamic feature of the vehicle 200 before the specific time point when the specific relative position is detected. Based on the dynamic feature history and the present specific relative position, the trajectory of the vehicle 200 can be calculated. For example, the processing device 305 may set the current position of the vehicle 100 as an origin in a coordinate system. A current position of the vehicle 200 in the coordinate system can be calculated based on the relative position of the vehicle 200 with regard to the vehicle 100. And the trajectory of the vehicle 200 calculated by the processing device 305 ends at the calculated current position of the vehicle 200.

In some embodiments, the processing device 305 may keep obtaining the dynamic data received from the vehicle 200 after the current time point. As such, the processing device 305 can calculate and keep updating the trajectory of the vehicle 200 after the specific time point, which trajectory starts from the calculated current position of the vehicle 200. In some embodiments, during updating the trajectory of the vehicle 200, the processing device 305 may modify the trajectory by user instruction or repeatedly. For example, in every 10 seconds, the processing device 305 may obtain a relative position of the vehicle 200 at the new present time point, calculate a new current position of the vehicle 200 based on the new relative position, and update the trajectory based on the new current position and the new dynamic data received from the vehicle 200 after the new present time point. Calculations of the trajectory of the vehicle 400, or other surrounding vehicles, are similar.

In some embodiments, the trajectory detection system 300 may further include a display device for illustrating the calculated trajectory thereon. Note that the calculate trajectory reflect movement of the target vehicle(s) relative to the host vehicle 100. Therefore, in some embodiments, an analogue of the vehicle 100, or even the trajectory of the vehicle 100 may also be illustrated together with the calculated trajectory on the display device.

There is little distinction left between hardware and software implementations of aspects of systems; the use of hardware or software is generally a design choice representing cost vs. efficiency tradeoffs. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A trajectory detection method, comprising:
receiving, on a first vehicle, from a second vehicle, dynamic data containing at least one dynamic feature of the second vehicle, the dynamic data including a first set of time points indicating when the dynamic data is transmitted from the second vehicle;
subtracting, with a processor of the first vehicle, a same predetermined value from each of the first set of time points to generate a second set of time points, the second set of time points indicating an estimated time at which the dynamic data is collected by the second vehicle;
detecting a relative position of the second vehicle with regard to the first vehicle at one of the second set of time points using an object detection sensor mounted on the first vehicle; and
generating, with the processor, a trajectory of the second vehicle based on the relative position, the dynamic data, and the second set of time points.

2. The trajectory detection method according to claim 1, wherein the relative position is detected by a radar, a lidar, a sonar or any combination thereof.

3. The trajectory detection method according to claim 1, wherein the dynamic data comprises velocity data and heading data.

4. The trajectory detection method according to claim 1, wherein the first vehicle detects the relative position of the second vehicle with regard to the first vehicle at a first time point, and calculates the trajectory of the second vehicle based on a first set of dynamic data containing the at least one dynamic feature of the second vehicle which is received before or after the first time point, where the trajectory ends at or starts from a point calculated based on a position where the first vehicle locates at the first time point and the relative position.

5. The trajectory detection method according to claim 1, further comprising:
receiving a plurality of sets of dynamic data from a plurality of vehicles;
detecting at least two relative positions of the second vehicle with regard to the first vehicle at different time points;
calculating a first position variation of each of the plurality of vehicles based on the dynamic data received from the corresponding vehicle;
calculating a second position variation of the second vehicle based on the at least two relative positions; and
determining whether there is a vehicle in the plurality of vehicles which represents the second vehicle by comparing the first position variation of each of the plurality of vehicles with the second position variation of the second vehicle.

6. The trajectory detection method according to claim 1, wherein the dynamic data is generated at different time points and transmitted in packets, and wherein the dynamic data is time aligned using the second set of time points.

7. The trajectory detection method according to claim 6, further comprising:
if there is a pair of neighboring time points in the second set of time points, which have an interval greater than a first predetermined threshold, performing an interpolation calculation for the dynamic data corresponding to the pair of neighboring time points.

8. The trajectory detection method according to claim 6, further comprising:
if there is a pair of neighboring time points in the second set of time points, which have an interval greater than a second predetermined threshold, modifying the latter time point in the pair to be closer to the former time point in the pair.

9. The trajectory detection method of claim 1, where the dynamic data is generated by a device mounted on the second vehicle.

10. A trajectory detection system mounted on a first vehicle, comprising:
an object detection sensor for detecting a relative position of a second vehicle with regard to the first vehicle;
a communication device for receiving, from the second vehicle, dynamic data containing at least one kind of dynamic feature of the second vehicle, the dynamic data including a first set of time points indicating when the dynamic data is transmitted from the second vehicle; and
a processing device for:
subtracting a predetermined value from each of the first set of time points to generate a second set of time points, the second set of time points indicating an estimated time at which the dynamic data is collected by the second vehicle,
detecting one of a packet drop condition and a congestion condition based on a comparison of a time interval between adjacent time points in the second set of time points,
adjusting the second set of time points according to a selected process to generate a modified second set of time points, the selected process being a first process responsive to detecting the packet drop condition and the selected process being a second process responsive to detecting the congestion condition, and
calculating a trajectory of the second vehicle based on the relative position, the dynamic data, and the modified second set of time points.

11. The trajectory detection system according to claim 10, wherein the object detection sensor comprises a radar, a lidar, a sonar or any combination thereof.

12. The trajectory detection system according to claim 10, wherein the dynamic data comprises velocity data and heading data.

13. The trajectory detection system according to claim 10, wherein the processing device is configured to:
obtain the relative position which is detected at a first time point;
obtain a first set of dynamic data which contains the at least one kind of dynamic feature of the second vehicle which is received before or after the first time point; and
calculate the trajectory of the second vehicle based on the first set of dynamic data, where the trajectory ends at or starts from a point calculated based on a position where the first vehicle locates at the first time point and the relative position.

14. The trajectory detection system according to claim 10, wherein the communication device is adapted for receiving a plurality of sets of dynamic data from a plurality of vehicles, and the processing device is further configured to:
calculate a first position variation of each of the plurality of vehicles based on the dynamic data received from the corresponding vehicle;
calculate a second position variation of the second vehicle based on at least two relative positions; and determine whether there is a vehicle in the plurality of vehicles which represents the second vehicle by comparing the first position variation of each of the plurality of vehicles with the second position variation of the second vehicle.

15. The trajectory detection system according to claim 10, wherein the communication device is adapted for receiving the dynamic data by packet, the object detection sensor is adapted for detecting relative positions of the second vehicle with regard to the first vehicle at different time points, and the processing device is further configured to:

compare the time interval between the adjacent time points in the second set of time points to each of a first threshold and a second threshold, to detect the packet drop condition responsive to determining that the time interval is greater than the first threshold and the second threshold, and to detect the congestion condition responsive to determining that the time interval is greater than the first threshold and less than the second threshold, the first threshold being lower than the second threshold.

16. The trajectory detection system according to claim 15, wherein the first process comprises performing, with the processing device, an interpolation calculation for the dynamic data corresponding to the adjacent time points in response to determining that the time interval between the adjacent time points is greater than the first threshold and the second threshold.

17. The trajectory detection system according to claim 15, wherein the second process comprises modifying, with the processing device, the latter time point in the adjacent time points to be closer to the former time point in the adjacent time points in response to determining that the time interval between the adjacent time points is greater than the first threshold and less than the second threshold.

18. A trajectory detection system, comprising a processing device configured to:

generate a trajectory of a first vehicle based on dynamic data containing at least one dynamic feature of the first vehicle, a position relationship between the first vehicle and a second vehicle, and a set of time points indicating an estimated time at which the dynamic data is collected by the second vehicle, where the dynamic data is generated by a device mounted on the first vehicle, the position relationship is generated by an object detection device mounted on the second vehicle, and the set of time points is estimated by subtracting a predetermined value from a set of timestamps associated with the dynamic data, and where the processing device is configured to further adjust the set of time points in a first process responsive to determining that a time interval between adjacent time points in the set of time points is above a first threshold and a second threshold, and to further adjust the set of time points in a second, different process responsive to determining that the time interval is above the first threshold and below the second threshold.

19. The trajectory detection system of claim 18, wherein the first process includes estimating dynamic data for a dropped packet collected between the adjacent time points based on the dynamic data collected at each of the adjacent time points and attributing a new time point between the adjacent time points as a collection time for the estimated dynamic data.

20. The trajectory detection system of claim 18, wherein the second process includes adjusting the latter one of the adjacent time points to be closer to the former one of the adjacent time points.

* * * * *